United States Patent Office 2,713,145
Patented July 12, 1955

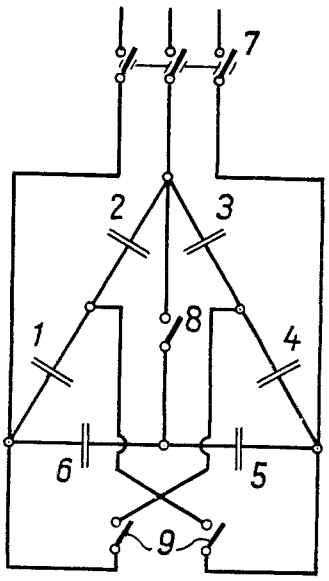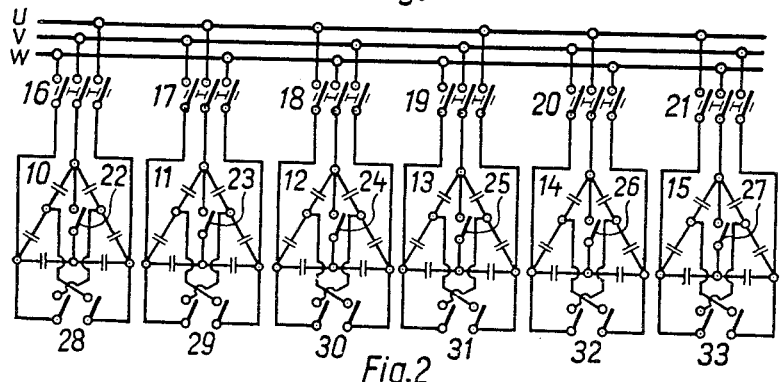

2,713,145

SWITCHING SYSTEM FOR ADJUSTABLE CONDENSER BATTERIES

Bjarne Storsand, Zurich, Switzerland, assignor to Ateliers de Construction Oerlikon, Zurich-Oerlikon, Switzerland, a corporation of Switzerland Application December 20, 1951, Serial No. 262,630

4 Claims. (Cl. 323—128)

The invention concerns a switching system for adjustable condenser batteries. In the case of condensers operating with variable potentials and frequencies, as for instance in the excitation of asynchronous generators with a variable number of revolutions, it is advantageous to connect them at high potential and frequency in series and at low potential and frequency in parallel. This decreases the tension stress of the condensers especially at high potential and the switching current pulses become smaller on switching to the source of potential. Furthermore it is desirable to be able to effect this switching from series to parallel without interruption and to bridge the variations of the resulting capacity value (C) by means of intermediate steps.

According to the present invention this is attained by connecting in delta each two condenser elements connected in series and afterwards establishing cross connections from each corner to the opposite center between two condensers so as to make it possible to switch over the individual elements without interruption from series to parallel connection.

The switching system of the invention is described in greater detail in the example of embodiment shown diagrammatically in the attached drawing.

Fig. 1 shows the connection of a triangular group. 1–6 are the condenser elements. 7, 8, 9, are the switches, 7 being the switch for the group, 8 for the first and 9 for the two additional cross connections. At the intermediate step the condensers 5 and 6 are each charged with the full phase potential. These must therefore be insulated more heavily than the condensers 1 to 4.

Fig. 2 shows the connection for six delta groups. 16 to 21 the switches for the connection to the bus bars U, V, W, and 22 to 27 the switches for the remaining cross connections.

Table, Fig. 3, shows a series of the connection with which the above-mentioned series of steps (St) of 0–3; 6; 9; 12C per phase is attained.

This switching system offers the advantage that the condensers receive on the first connection to the network about one fourth of the current and that the current pulses are small for parallel connection in consequence of the existing charge of the condensers. For example, if each condenser unit has the capacity value 1 the resulting capacity value C per phase is 0.5 in the case of series connection and 2 in the case of paralleled connection. In order to bridge this interval by intermediate steps, three such triangle groups with a total of $$\frac{3 \times 0.5}{3 \times 2} = \frac{1.5}{6}$$

per phase were used first, only one cross-connection being first established, each time proceeding from another phase corner. By doing so a middle step is produced with a capacity value of 3, with the result that these triangle groups have the capacity values 1.5; 3; 6.

For the purpose of damping the switching in current pulse small inductive capacities and damping resistances may be arranged in the conventional manner in the individual connections.

Having thus described my invention, I claim:

1. A switching system comprising the combination with a three-phase variable frequency and potential system comprising three bus bars, of six condensers, means connecting said condensers in a delta each of the three legs of which contains a pair of such condensers in series circuit relation with each other, means including a separate switch for selectively connecting under load the junction between each adjoining pair of such legs with the other leg of such delta at a point located between the two condensers in such other leg, whereby such pairs of condensers can be switched individually without interruption from series to parallel, and means including a three-phase switch for connecting such junctions to said three bus bars.

2. A switching system comprising the combination with a three-phase variable frequency and potential line comprising three bus bars, of three groups of condensers, and means including a separate three-phase switch for selectively connecting each of said groups of condensers to said bus bars, each of such condenser groups consisting of a delta having three legs, each leg containing a pair of condensers connected in series with each other, and means including a separate switch for selectively connecting under load the juncture between each pair of adjoining legs of the delta with a point between the two condensers of the other leg of such delta.

3. The combination comprising a three-phase variable frequency and potential system, a plurality of batteries of groups of condensers, each battery containing three of such groups, and each group containing six condenser elements, means connecting the six condenser elements of each group in a delta each of the legs of which comprises a pair of such condenser elements, means including a switch for selectively connecting under load the juncture between adjoining legs of the delta with a point on the other leg of such delta between the two condensers of such other leg, and means including a three-phase switch for individually connecting each of such groups to said three-phase power system.

4. A switching system for adjusting, under load, three-phase condenser batteries, comprising at least three main delta connected three-phase condenser groups, each of said group consisting of six condenser elements connected in pairs in series, said series connected groups being connected in delta, and means including switches providing for the selective connection or disconnection of each corner of the said delta connected main condenser groups to the opposite center between two condensers, so as to selectively switch the individual elements under load from series to parallel and vice versa, and at the same time making it possible to obtain a number of intermediate steps between the series and the parallel connection in order to obtain a relatively fine graduation of the capacitive current, and avoid relatively high impulse currents and voltages during operation.

References Cited in the file of this patent
UNITED STATES PATENTS

| | | |
|---|---|---|
| 1,843,921 | Gay | Feb. 9, 1932 |
| 2,057,214 | Sleeter et al. | Oct. 13, 1936 |
| 2,317,970 | Alimansky | May 4, 1943 |